United States Patent
Pratt et al.

(10) Patent No.: US 12,367,499 B2
(45) Date of Patent: Jul. 22, 2025

(54) BATTERY DIGITAL ASSETS, AND ACCOUNTABILITY

(71) Applicant: CPS Technology Holdings LLC, New York, NY (US)

(72) Inventors: Wyatt Pratt, Rockville, MD (US); John P. Bania, Whitefish Bay, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

(21) Appl. No.: 18/322,873

(22) Filed: May 24, 2023

(65) Prior Publication Data

US 2023/0385848 A1  Nov. 30, 2023

Related U.S. Application Data (60) Provisional application No. 63/345,327, filed on May 24, 2022.

(51) Int. Cl.
*G06Q 30/018* (2023.01)
*G06Q 50/26* (2024.01)

(52) U.S. Cl.
CPC ........... *G06Q 30/018* (2013.01); *G06Q 50/26* (2013.01)

(58) Field of Classification Search
None
See application file for complete search history.

(56) References Cited

U.S. PATENT DOCUMENTS

| | | | |
|---|---|---|---|
| 11,444,338 B1* | 9/2022 | Dhawan | H01M 50/569 |
| 2005/0035738 A1* | 2/2005 | Patino | H01M 10/42 320/106 |
| 2006/0178170 A1 | 8/2006 | Chung et al. | |
| 2011/0121951 A1* | 5/2011 | Yao | H01M 50/107 340/10.42 |
| 2012/0050054 A1* | 3/2012 | Fujiwara | B60L 58/21 340/636.1 |
| 2012/0284514 A1* | 11/2012 | Lambert | H04L 9/32 713/168 |
| 2013/0105578 A1* | 5/2013 | Bolanos | G06Q 50/28 235/385 |

(Continued)

FOREIGN PATENT DOCUMENTS

| CN | 112801318 A | * 5/2021 | ....... G06Q 10/06393 |
|---|---|---|---|
| CN | 114444876 A1 | 5/2022 | |

(Continued)

OTHER PUBLICATIONS

Dickinson, Blockchain and sustainability through responsible sourcing, Dec. 28, 2020, IBM, pp. 1-6. (Year: 2020).*

*Primary Examiner* — Sarah M Monfeldt
*Assistant Examiner* — Michael J. Monaghan
(74) *Attorney, Agent, or Firm* — Weisberg I.P. Law, P.A.

(57) ABSTRACT

A vehicle battery device comprising a vehicle battery is described. The vehicle battery has a first identifier and a second identifier. The first identifier is publicly ascertainable and associated to a discrete vehicle battery. The first identifier represents the associated vehicle battery to be uniquely distinct from other vehicle batteries. The second identifier is different from the first identifier, an electronically retrievable identifier, confidential, and ascertainable by conformance with a security protocol.

18 Claims, 5 Drawing Sheets

(56) References Cited

U.S. PATENT DOCUMENTS

| | | | |
|---|---|---|---|
| 2013/0260188 A1* | 10/2013 | Coates | H01M 10/42 |
| | | | 429/61 |
| 2014/0108171 A1* | 4/2014 | Bernheim | G06Q 30/01 |
| | | | 705/17 |
| 2016/0064781 A1* | 3/2016 | Specht | H01M 10/488 |
| | | | 429/90 |
| 2017/0011407 A1* | 1/2017 | Schmitz | G06Q 30/0185 |
| 2018/0034068 A1* | 2/2018 | Perry | H01M 10/54 |
| 2018/0046830 A1 | 2/2018 | Shankar et al. | |
| 2019/0097808 A1* | 3/2019 | Scott | G06K 19/086 |
| 2019/0280343 A1* | 9/2019 | Wang | B60L 53/65 |
| 2019/0318350 A1* | 10/2019 | Hinkel | H04L 9/3247 |
| 2019/0342085 A1* | 11/2019 | Kube | H04L 9/3247 |
| 2019/0366475 A1* | 12/2019 | Scarselli | G06F 21/602 |
| 2019/0385120 A1* | 12/2019 | Yund | H04L 63/123 |
| 2020/0019923 A1* | 1/2020 | Santhar | G06Q 10/0838 |
| 2020/0110453 A1* | 4/2020 | Wells | B60L 53/60 |
| 2020/0200824 A1* | 6/2020 | Narayanaswami | H04L 67/12 |
| 2020/0313249 A1* | 10/2020 | Zhao | G06Q 10/087 |
| 2020/0357197 A1* | 11/2020 | Chen | H01M 10/48 |
| 2020/0376979 A1* | 12/2020 | Liang | B60L 53/80 |
| 2020/0389301 A1* | 12/2020 | Detres | G06F 9/45558 |
| 2021/0001377 A1* | 1/2021 | Sutton | G06N 3/08 |
| 2021/0192470 A1* | 6/2021 | Krueger | G06Q 10/20 |
| 2021/0248653 A1* | 8/2021 | McKenzie | G06F 21/44 |
| 2021/0336460 A1* | 10/2021 | Molchadsky | H01M 10/4257 |
| 2021/0339649 A1* | 11/2021 | Ueno | H02J 7/007194 |
| 2022/0082627 A1* | 3/2022 | O'Mahony | H01M 10/4221 |
| 2022/0113356 A1* | 4/2022 | Kasselman | H01M 10/4257 |
| 2022/0255148 A1* | 8/2022 | Palatov | H01M 10/4257 |
| 2022/0269754 A1* | 8/2022 | Cardo Sanchez | G06F 21/105 |
| 2022/0305945 A1* | 9/2022 | Dooley | H04L 9/3239 |
| 2022/0340039 A1* | 10/2022 | Unagami | B60L 53/66 |
| 2022/0351165 A1 | 11/2022 | Regenor | |
| 2023/0009714 A1* | 1/2023 | Jeong | B60L 58/10 |
| 2023/0062093 A1* | 3/2023 | Ohata | H01M 10/4257 |
| 2023/0120239 A1* | 4/2023 | Kasselman | H01M 10/441 |
| | | | 320/118 |
| 2023/0219454 A1* | 7/2023 | Wang | B60L 53/65 |
| | | | 320/109 |
| 2023/0224158 A1* | 7/2023 | Eckart | G06Q 10/30 |
| | | | 713/168 |
| 2023/0252489 A1* | 8/2023 | Cella | G05B 19/042 |
| | | | 705/317 |

FOREIGN PATENT DOCUMENTS

| | | | | |
|---|---|---|---|---|
| WO | WO-2020072069 A1 * | 4/2020 | | G06Q 10/00 |
| WO | 2023114171 A2 | 6/2023 | | |

* cited by examiner

BATTERY DIGITAL ASSETS, AND ACCOUNTABILITY

CROSS-REFERENCE TO RELATED PATENT APPLICATIONS

This application is related to and claims priority to U.S. Provisional Patent Application Ser. No. 63/345,327, filed May 24, 2022, entitled BATTERY NON-FUNGIBLE TOKENS, the entirety of which is incorporated herein by reference.

TECHNICAL FIELD

This disclosure relates to energy storage units such as batteries, and in particular to battery management systems (BMS) of batteries and/or digital assets, e.g., non-fungible tokens (NFTs), supported by the BMS for use in/with batteries.

BACKGROUND

Batteries are an essential part of many devices, including vehicles such as motor vehicles, electric vehicles (EV), etc. More specifically, vehicles are typically equipped with a battery used to operate the vehicle, e.g., start a vehicle's motor, power vehicle systems such as charging system, motors, motor drives, lighting, accessories, etc. A battery may be associated with multiple events throughout the life of the battery, such as from battery design and battery manufacturing through disposal (e.g., recycling). Some events may also include obtaining battery service and/or replacement. For example, an owner of a vehicle may want to service a battery (e.g., clean terminals, calibrate the battery management system, replace a battery component, etc.) such as part of an obligation by the maker or seller of the battery. In some cases, the owner of the vehicle may want to replace the entire battery such that when battery charge of a battery in the vehicle is lower than a charge threshold (e.g., as part of a battery exchange program). Battery service and battery replacement typically require expertise outside of the customer's abilities to properly address a malfunctioning component of the entire battery (e.g., as a core exchange). Such situations are cumbersome, and these situations expose customers of the batteries to commercial interactions that are difficult. Additionally, customers are limited in their ability to specify any conditions that customer considers important in the purchase and use of the vehicle battery. Further, an exchanged battery may be a battery that does not meet one or more specifications to operate the vehicle, a battery of another kind intended for another purpose, and/or a counterfeit battery, etc. Similarly, when the battery is replaced, the new and/or replacement battery may turn out to be counterfeit. Thus, service and exchange of batteries without ensuring the authenticity of the battery imparts risks to both the customer and manufacturer of the battery and may cause undesired results in the operation of the vehicle.

SUMMARY

Some embodiments advantageously provide a method, apparatus, and system for validated identification of a device used in commerce, regulatory or research environments, preferably a battery management system that ensures the authenticity of batteries provided. Preferably, the validated identification of the device is self-evident or self-proving within the device, e.g., no additional documentation is required to be associated with the device as it is used in commerce or transported across jurisdictional boundaries. In some embodiments, a vehicle battery system has a private identifier and a public identifier together, and an associated non-fungible token (NFT) for use and anti-counterfeiting determinations.

According to one aspect, the invention includes a vehicle battery device having a vehicle battery with a first public identifier and a second confidential identifier. Preferably, the vehicle battery device includes a digital asset, such as a non-fungible token (NFT).

According to another aspect, a vehicle battery system comprising the vehicle battery device and a database accessible for validating the existence of a counterfeit battery is described.

According to one aspect, a method for ascertaining vehicle battery parameters is described. The method includes the steps of creating a vehicle battery NFT and creating conditions within the NFT addressing commercial transactions conditions or governmental regulatory oversight.

According to another aspect, a vehicle battery device is described. The vehicle battery device includes a vehicle battery. The vehicle battery has a first identifier and a second identifier. The first identifier is publicly ascertainable and associated with a discrete vehicle battery. The first identifier represents the associated vehicle battery to be uniquely distinct from other vehicle batteries. The second identifier is different from the first identifier, with the second identifier being an electronically retrievable identifier that is confidential and ascertainable by conformance with a security protocol.

In some embodiments, the vehicle battery device includes a digital asset associated with the vehicle battery.

In some other embodiments, the digital asset defines life cycle attributes (LCAs) for commercial or governmental validation.

In some embodiments, the digital asset is a non-fungible token.

In some other embodiments, the LCAs address commercial use of the vehicle battery. The LCAs may include one or more of commercial uses of component sourcing of the vehicle battery, manufacturing of the vehicle battery, recycling of the vehicle battery, servicing of the vehicle battery, repair of the vehicle battery, replacement of the vehicle battery, conditions of use of the vehicle battery, reliability of the vehicle battery, functionality of the vehicle battery, operational performance of the vehicle battery, programs and information relating to the vehicle battery, and combinations thereof.

In some embodiments, the LCAs address governmental formalities of the vehicle battery. The LCAs may include one or more of governmental formalities of import validations of the vehicle battery, export validations of the vehicle battery, storage of the vehicle battery, component sourcing of the vehicle battery, manufacturing of the vehicle battery, recycling of the vehicle battery, servicing of the vehicle battery, repair of the vehicle battery, replacement of the vehicle battery, conditions of use of the vehicle battery, reliability of the vehicle battery, functionality of the vehicle battery, operational performance of the vehicle battery, programs and information relating to the vehicle battery, and combinations thereof.

In some other embodiments, the first identifier and the second identifier are sequenced to identify manufacturing origins of the vehicle battery.

In some embodiments, the first identifier and the second identifier are each sequenced to identify different manufacturing origins of the vehicle battery.

According to one aspect, a vehicle battery system is described. The vehicle battery system includes a vehicle battery device that has a vehicle battery with a first identifier, a second identifier, and a digital asset. The first identifier is publicly ascertainable and associated to a discrete vehicle battery. The first identifier represents the associated vehicle battery to be uniquely distinct from other vehicle batteries. The second identifier is different from the first identifier; an electronically retrievable identifier; confidential; ascertainable by conformance with a security protocol. The digital asset is associated with the vehicle battery. The first identifier and the second identifier being stored within a database accessible for validating an existence of a counterfeit battery.

In some embodiments, the database is accessible by a governmental entity.

In some other embodiments, the digital asset represents LCAs for the commercial use of battery leasing.

In some embodiments, the digital asset represents LCAs for the commercial use of battery servicing.

In some other embodiments, the digital asset represents LCAs for the governmental regulation of importation into a country.

In some embodiments, the digital asset represents LCAs for the governmental regulation of exportation from a country.

According to another aspect, a method for ascertaining vehicle battery parameters is described. The method includes the steps of creating a vehicle battery digital asset based on a distinct vehicle battery and creating conditions, within the non-fungible token, addressing commercial transactions conditions or governmental regulatory oversight. The distinct vehicle battery is incorporated within a vehicle battery system. The vehicle battery system has a vehicle battery device with a first identifier and a second identifier, and a non-fungible token associated with the vehicle battery. The first identifier is publicly ascertainable and associated to a discrete vehicle battery. The first identifier represents the associated vehicle battery to be uniquely distinct from other vehicle batteries. The second identifier is confidential and ascertainable by conformance with a security protocol. The first and second identifiers are stored within a database accessible for validating the existence of a counterfeit or non-counterfeit battery.

In some embodiments, the non-fungible token addresses commercial transaction conditions for vehicle battery leasing.

In some other embodiments, the non-fungible token addresses commercial transaction conditions for vehicle battery servicing.

In some embodiments, the non-fungible token addresses governmental regulatory oversight for vehicle battery importation.

In some other embodiments, the non-fungible token addresses governmental regulatory oversight for vehicle battery exportation.

According to one aspect, a recycled battery product resulting from the method for ascertaining vehicle battery parameters is described.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to management of authenticity of a battery (and/or its components), for example, a lead acid or Li-Ion battery. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In some embodiments, the term identifier is used and may refer to any information usable to identify and/or authenticate any components of the system described herein such as a battery, vehicle, device, server, etc. The identifier may also refer to information usable to identify and/or authenticate users of such components. Further, the identifier may comprise any number and/or alphanumeric string of characters, data, image, video, etc. An identifier may be public, private, confidential, etc. as specified for its use as part of the invention. A public identifier may refer to an identifier that is or that may be made accessible for public inspection, e.g., ownership of an NFT. Private information may refer to information that is not accessible for public inspection, e.g., authentication information. In some embodiments, the term "prefix field" is used and may refer to data or information that is positioned before (e.g., at one end) other data or information such as before an identifier. In some embodiments, the term "suffix field" is used and may refer to data or information that is positioned after (e.g., appended to) other data or information such as after an identifier. In some embodiments, the term attribute is used and may refer to a quality, feature, characteristic, parameter, etc. An attribute may be associated with a battery, e.g., the attribute may comprise life cycle attributes of the battery such as battery manufacturing information, battery export information, battery import information, battery service information, battery use information, recycling information; etc.

In some embodiments, the term "battery manufacturing information" is used and may refer to any information associated with manufacturing of a battery such as manufacturing date, manufacturing lot information, manufacturing components (e.g., used to manufacture the battery), manufacturing processes, manufacturing quality parameters, manufacturing testing, etc. The term "battery export information" may refer to any information associated with exporting a battery such as export regulations, requirements, best practices, etc. Similarly, the term "battery import information" may refer to any information associated with importing a battery such as import regulations, requirements, best practices, etc. Battery use information may refer to parameters indicative of battery use such as cracking information, load information, environmental parameters associated with use of the battery, etc. Recycling information may refer to any information associated with the recycling of the battery such as recycling entity, recycling requirements, recycling process, recycling parameters, etc.

The term parameter may refer to parameters associated with a battery (and/or its components) such as voltage, temperature, pressure, power, current, state of charge (SoC), state of health (SoH), etc.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible for achieving the electrical and data communication.

A non-fungible token (NFT) may refer to a digital asset, which may be unique and/or used to represent a tangible asset such as a battery. One or more transactions may be associated with NFTs such as selling, buying, etc., and may be carried out using currency such as cryptocurrency. Each NFT may be configured to have a digital signature that may be unique, thereby making NFTs useful for uniquely identifying assets. Further, an NFT may be configured to correspond to exclusive ownership and/or exclusive ownership rights. For example, an NFT may be configured to only have one owner at a time and/or use blockchain technology to initiate and/or establish and/or verify and/or terminate ownership of an asset. Such an asset can be a battery where the NFT is used to provide ownership of the battery and/or authenticity of the battery. A blockchain may refer to a public digital ledger that is used to record transactions across multiple computers. Authenticity of the battery may refer to meeting one or more requirements such as matching predetermined identifiers with measured identifiers (or identifiers provided by a user), meeting or exceeding performance measures associated with the battery (life cycle attributes that match or exceed predetermined requirements). Further, the asset may refer to the performance of the battery such as throughout the battery lifecycle. As later described in more detail, life cycle attributes are representations of the battery lifecycle and, in the case of commercial utility, define legal obligations with regard to the physical device, and, in the case of governmental regulatory requirements, attest to battery conditions in fulfillment of these governmental regulatory requirements.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
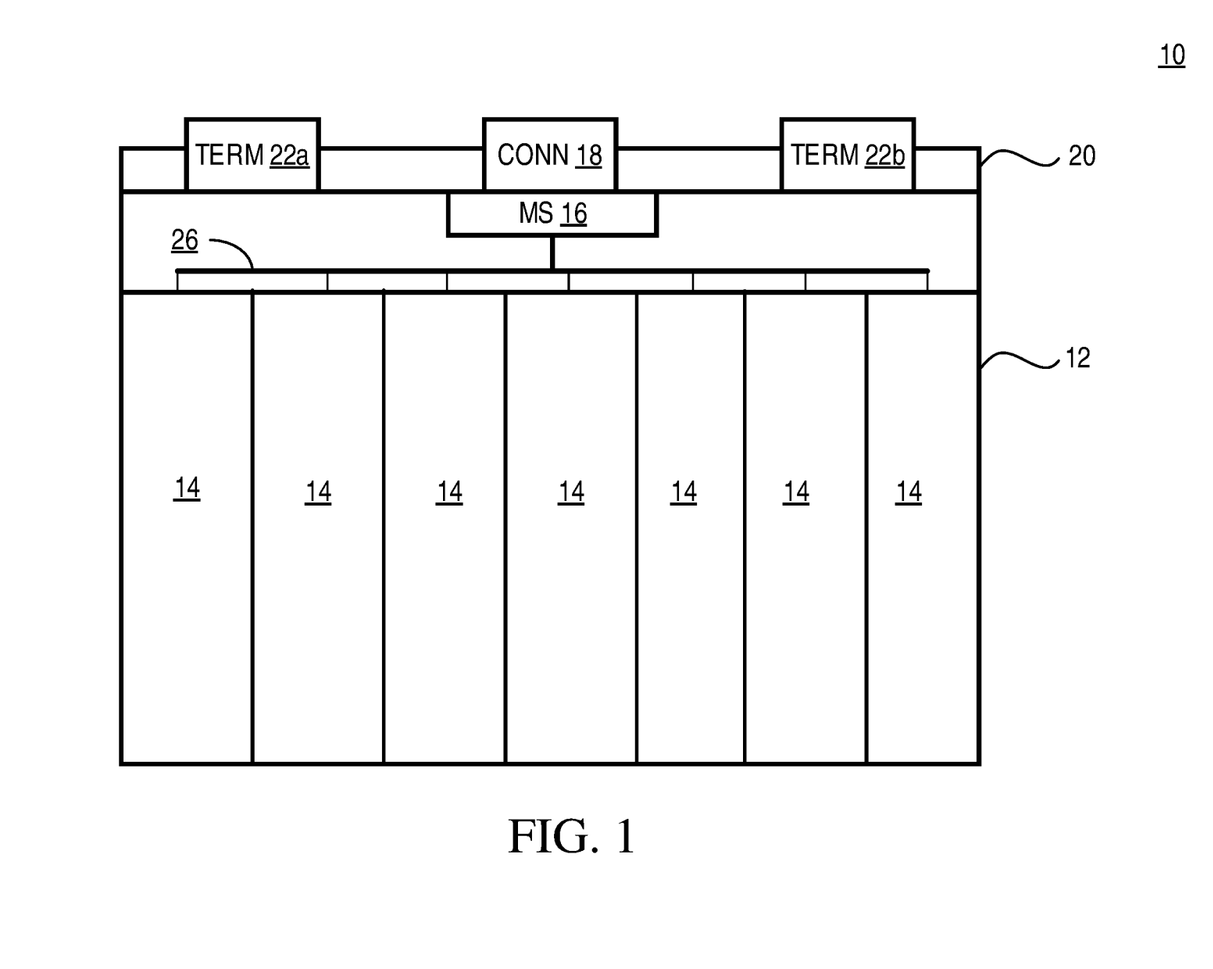
FIG. 1 is a block diagram of an example battery constructed in accordance with the principles of present disclosure.

Referring now to the drawing figures in which like reference numbers refer to like elements, there is shown a most preferred embodiment of the invention in FIG. 1, of a battery 10 constructed in accordance with the principles of the present disclosure. Battery 10 includes a housing 12 into which one or more cells 14 are positioned. The cells 14 may be electrically interconnected (not shown in the FIGS), such as via an electrically conductive bus bar system that electrically interconnects the cells 14 in an electrically serial, electrically parallel or combination of electrically serial and parallel manner, depending on the intended voltage and current requirements.

A management system (MS) 16 may be included. In one or more embodiments, MS 16 may be associated with a battery 10, e.g., MS 16 is a battery management system. In some embodiments, the MS 16 may determine authenticity of battery 10 and/or determine at least one of: one or more battery, certificate of authenticity, and an anti-counterfeit measure and/or initiate and/or establish and/or verify and/or terminate ownership. MS 16 may also be connected to one or more cells 14. For example, MS 16 may be physically and/or electrically connected to a plurality of leads 26 (e.g., lead assembly), where each lead 26 is physically and/or electrically connected to a cell 14. That is, MS 16 may be configured to determine (e.g., measure) one or more parameters of each cell 14, via a lead 26. For example, the MS 16 may measure certain battery parameters, e.g., voltage, temperature, pressure, power, current, etc., and provide the data to an external system. The plurality of leads 26 may be comprised (e.g., be part of) battery 10 and/or MS 16.

MS 16 may include a monitoring connector 18 that allows for an external connection to the vehicle's data bus and/or a cloud network and/or a server and/or a client device and/or some other communication device. The monitoring connector 18 can, in some embodiments, be integrated with the housing 12, such as in a cover 20 of the housing 12. Battery 10 also includes terminals, such as a negative terminal 22a and a positive terminal 22b (collectively referred to as terminals 22) to provide the contact points for electrical connection of the battery 10 to the vehicle to provide the auxiliary power to the vehicle. Terminals 22 are arranged to protrude through housing 12, such as protruding through cover 20. Terminals 22 may be electrically connected to the bus bars inside housing 12 and/or directly connected to the cells 14 (not shown in the FIGS). In some embodiments, housing 12 includes one or more vent holes 24 to allow venting from one or more of the cells 14.

Battery 10 can be arranged to provide many power capacities and physical sizes, and to operate under various parameters and parameter ranges. It is also noted that implementations of battery 10 can be scaled to provide various capacities. Power capacity scaling can be accomplished, for example, by using higher or lower power capacity cells 14 in the housing 12, and/or by using fewer or more cells 14 in the housing 12. In some embodiments, battery 10 may be incorporated as part of a vehicle such as an electric vehicle (EV) or another type of vehicle where battery power is needed. Other electrical parameters of the battery 10 can be adjusted and/or accommodated by using cells 14 that may cumulatively have the desired operational characteristics, e.g., voltage, charging capacity/rate, discharge rate, etc. Thermal properties can be managed based on cell 14 characteristics, the use of heat sinks and/or thermal energy discharge plates, etc., within or external to the housing 12.

Figure 2:
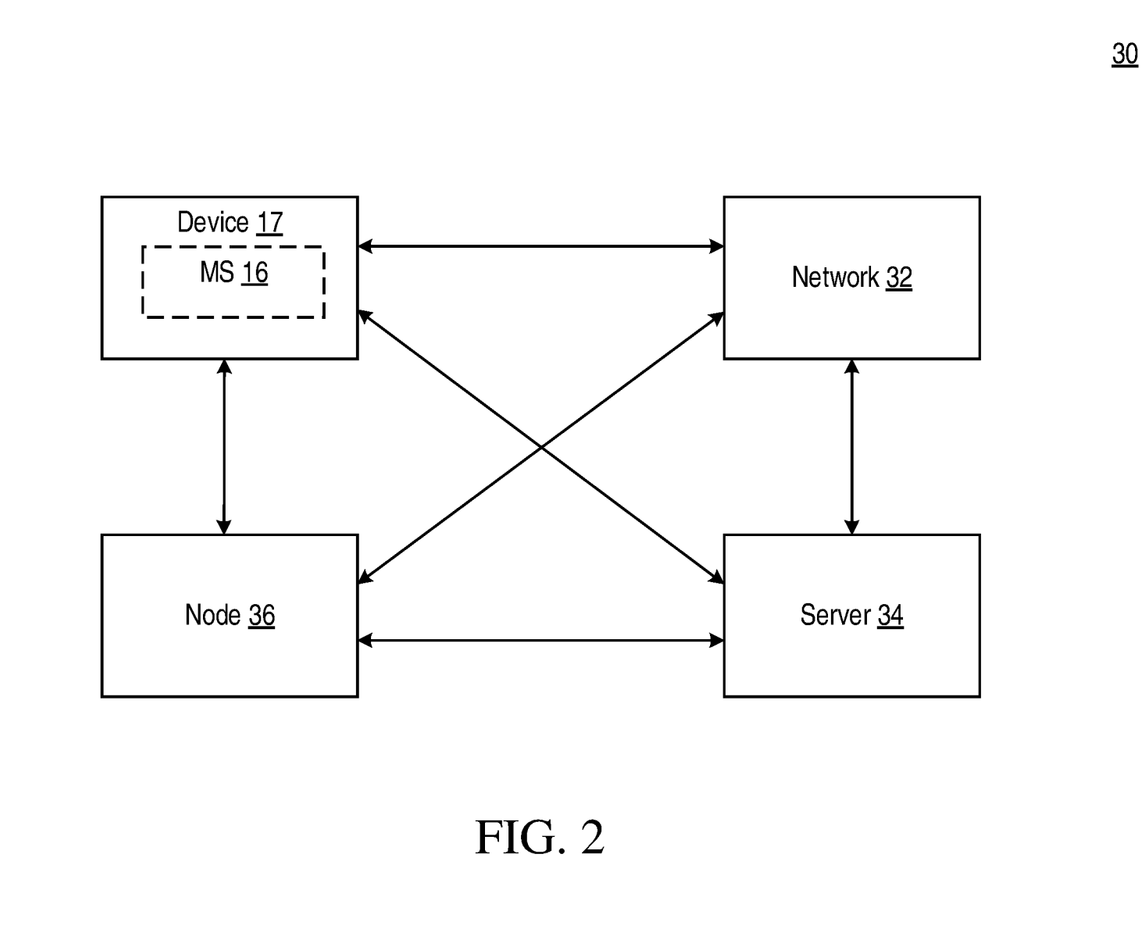
FIG. 2 shows an example system in accordance with the principles of present disclosure.

FIG. 2 shows an example system 30 in accordance with the principles of present disclosure. System 30 may include one or more of each of the following: MS 16, device 17, network 32, server 34, and/or node 36. Device 17 may be arranged to include MS 16 (and/or a corresponding battery 10). In this nonlimiting example, device 17 and/or MS 16 may be configured to communicate with network 32 and/or server 34 and/or node 36. Network 32 may be configured to provide communication functions and/or network functions to device 17 and/or MS 16 and/or server 34 and/or node 36 such as access to one or more servers (e.g., server 34) and/or server functions. Server 34 may be any server, computer, client device, network node, network device, etc. Server 34 may be configured to communicate with device 17 and/or MS 16 and/or network 32 and/or node 36. Server 34 may be standalone, integrated with MS 16 and/or device 17 and/or network 32 and/or node 36, etc. Similarly, MS 16 may be standalone, part of a node 36, part of battery 10, integrated with network 32 and/or server 34, etc. Device 17 may also be standalone and be arranged to receive an object (e.g., battery 10). Further, MS 16 and/or device 17 (and/or network 32 and/or server 34 and/or node 36) may be configured to perform any of the steps and/or tasks and/or methods and/or processes and/or features described herein, e.g., determining authenticity (such as of a battery 10) using one or more NFTs. MS 16 may include processing circuitry, such as a processing unit (e.g., processor) and memory, to perform one or more functions described herein. MS 16 may include communication units (e.g., communication interfaces) to communicate with sensors (e.g., that monitor the cells 14 and/or other operational parameters of the battery 10 or any other device, and/or communicate with external elements such as network 32 and/or server 34 and/or node 36).

Example implementations, in accordance with an embodiment, of MS 16 and/or device 17, node 36, and server 34 discussed in the preceding paragraphs will now be described with reference to FIG. 3. MS 16 may have hardware 40 that may include a communication interface 42 that is configured to communicate with one or more entities in system 30 via wired and/or wireless communication. The communication may be protocol based communications.

The hardware 40 includes processing circuitry 44. The processing circuitry 44 may include a processor 46 and memory 48. In particular, in addition to or instead of a processor, such as a central processing unit, and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) memory 48, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Memory 48 may include one or more databases.

Thus, the MS 16 may further comprise software 60, which is stored in, for example, memory 48, or stored in external memory (e.g., database, etc.) accessible by the MS 16. The software 60 may be executable by the processing circuitry 44. Software 60 may include software application 62 and/or firmware 64.

The processing circuitry 44 may be configured to control any of the methods and/or processes described herein and/or to cause such methods, and/or processes to be performed, e.g., by MS 16. The processor 46 corresponds to one or more processors 46 for performing MS 16 functions described herein. The MS 16 includes memory 48 that is configured to store data, programmatic software code and/or other information described herein. In some embodiments, the software 60 may include instructions that, when executed by the processor 46 and/or processing circuitry 44, causes the processor 46 and/or processing circuitry 44 to perform the processes described herein with respect to MS 16. For example, the processing circuitry 44 of the MS 16 may include MS management unit 50 that is configured to perform any step and/or task and/or process and/or method and/or feature described in the present disclosure, e.g., performing one or more steps associated with NFTs. While MS management unit 50 is illustrated as being part of MS 16, MS management unit 50 and associated functions described herein may be implemented in a device separate from MS 16 such as in battery 10 or another device.

Hardware 40 may also comprise one or more circuit elements 70 such as resistors, capacitors, inductors, diodes, transistors, ground connections, source elements, sink elements, etc. Circuit elements 70 may be arranged in any configuration or connection such as series, parallel, combinations thereof, etc., and may be connected to any other device such as a component of system 30.

Node 36 may have hardware 80 that may include a communication interface 82 that is configured to communicate with one or more entities in system 30 (and/or outside of system 30) via wired and/or wireless communication. The communication may be protocol based communication. In some embodiments, node 36 may also be configured to electrically connect to battery 10, e.g., to power node 36 and/or receive at least one parameter (and/or parameter data) from battery 10 and/or display the at least one parameter.

The hardware 80 includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Memory 88 may include one or more databases.

Node 36 may further include software 100, which is stored in, for example, memory 88, or stored in external memory (e.g., database, etc.) accessible by the node 36. The software 100 may be executable by the processing circuitry 84.

The processing circuitry 84 may be configured to control any of the methods and/or processes described herein and/or to cause such methods, and/or processes to be performed, e.g., by node 36. The processor 86 corresponds to one or more processors 86 for performing node 36 functions described herein. The node 36 includes memory 88 that is configured to store data, programmatic software code and/or other information described herein. In some embodiments, the software 100 may include instructions that, when executed by the processor 86 and/or processing circuitry 84, causes the processor 86 and/or processing circuitry 84 to perform the processes described herein with respect to node 36. For example, the processing circuitry 84 of node 36 may include device unit 90 configured to perform any step and/or task and/or process and/or method and/or feature described in the present disclosure, e.g., determining one or more parameters, steps, and/or processes associated with battery 10. Node 36 may also include display 110 configured to display an indication associated with a measured/determined at least one parameter, e.g., associated with battery 10. The at least one parameter may include state of charge, voltage, current, etc. Display 110 may comprise a monitor, a screen, and/or any other type of display.

In some embodiments, node 36 and/or any of its components such as display 110 may be included in MS 16 (and/or battery 10) and/or be powered by MS 16 (and/or battery 10). In some other embodiments, node 36 is a wireless device such as a smartphone, laptop, tablet, etc.

Further, server 34 includes hardware 120, and hardware 120 may include a communication interface 122 for performing wired and/or wireless communication with MS 16 and/or node 36 and/or any other device. For example, communication interface 122 of server 34 may communicate with communication interface 82 of node 36 via communication link 91. In addition, communication interface 122 of server 34 may communicate with communication interface 42 of MS 16 via communication link 93. Similarly, communication interface 42 may communicate with communication interface 82 via communication link 95. At least one of communication links 91, 93 and/or 95 may refer to a wired/wireless connection (such as WiFi, Bluetooth, etc.).

In the embodiment shown, the hardware 120 of server 34 includes processing circuitry 124. The processing circuitry 124 may include a processor 126 and a memory 128. In particular, in addition to or instead of a processor, such as a central processing unit, and memory, the processing circuitry 124 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 126 may be configured to access (e.g., write to and/or read from) the memory 128, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Memory 128 may include one or more databases.

Thus, the server 34 further has software 140 stored internally in, for example, memory 128, or stored in external memory (e.g., database, etc.) accessible by the server 34 via an external connection. The software 140 may be executable by the processing circuitry 124. The processing circuitry 124 may be configured to control any of the methods and/or processes described herein and/or to cause such methods, and/or processes to be performed, e.g., by server 34. Processor 126 corresponds to one or more processors 126 for performing server 34 functions described herein. The memory 128 is configured to store data, programmatic software code and/or other information described herein. In some embodiments, the software 140 may include instructions that, when executed by the processor 126 and/or processing circuitry 124, causes the processor 126 and/or processing circuitry 124 to perform the processes described herein with respect to server 34. For example, processing circuitry 124 of server 34 may include server management unit 130 that is configured to perform one or more server 34 functions as described herein, e.g., performing one or more steps associated with NFTs.

In some embodiments, node 36 may be comprised in a MS 16 and/or battery 10 (as shown in FIG. 1) and/or be standalone. In some other embodiments, node 36 may be configured to perform any MS function. In some embodiments, node 36 and battery 10 are comprised in a vehicle, and node 36 may be connectable to battery 10 and/or MS 16.

Figure 3:
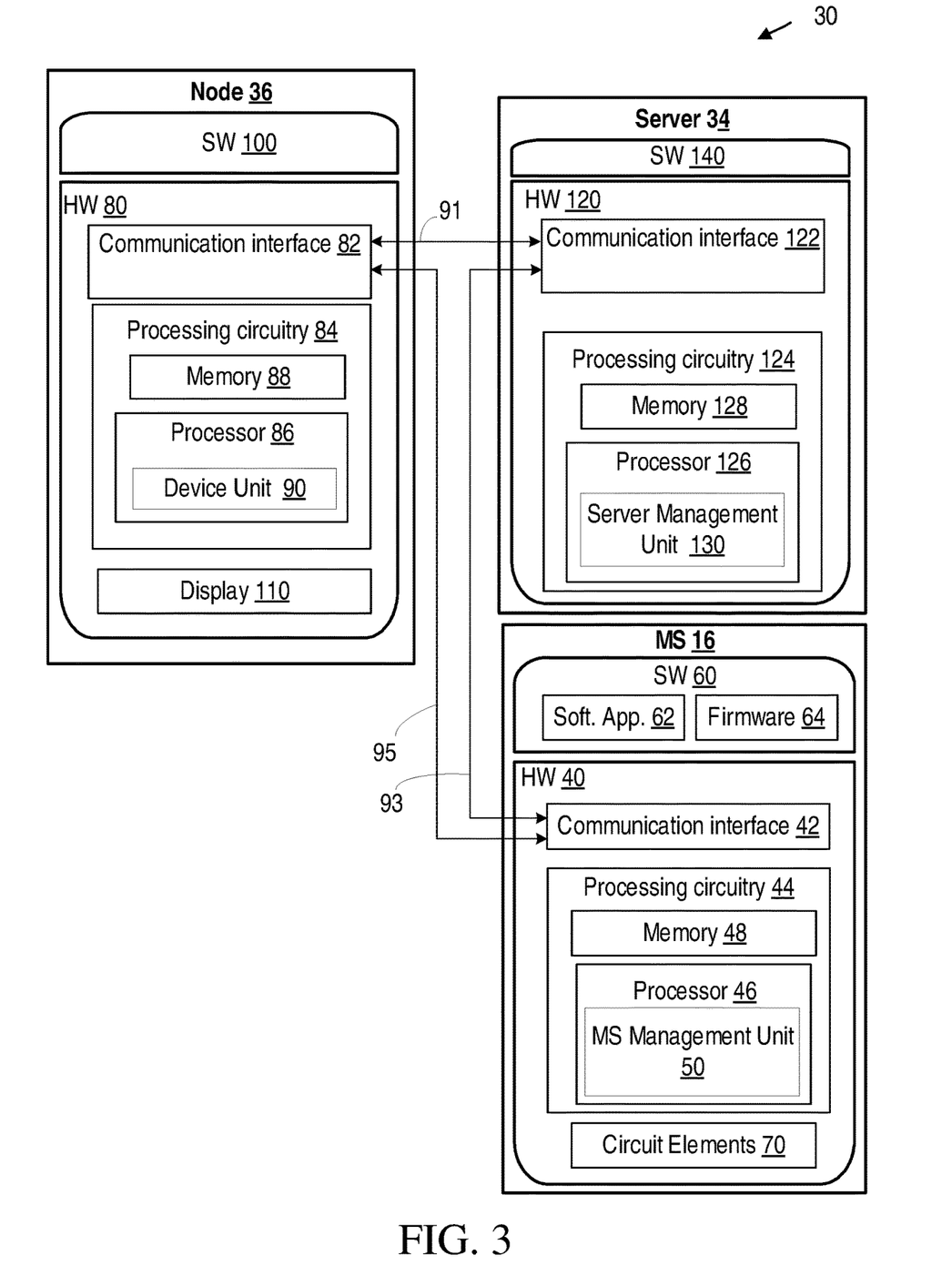
FIG. 3 is a block diagram of some entities in the system according to some embodiments of the present disclosure.

Although FIG. 3 shows one or more "units" such as MS management unit 50, device unit 90, server management unit 130 as being within a respective processor, it is contemplated that these units may be implemented such that a portion of the unit is stored in a corresponding memory within the processing circuitry. In other words, the units may be implemented in hardware, software or in a combination of hardware and software within the processing circuitry.

Figure 4:
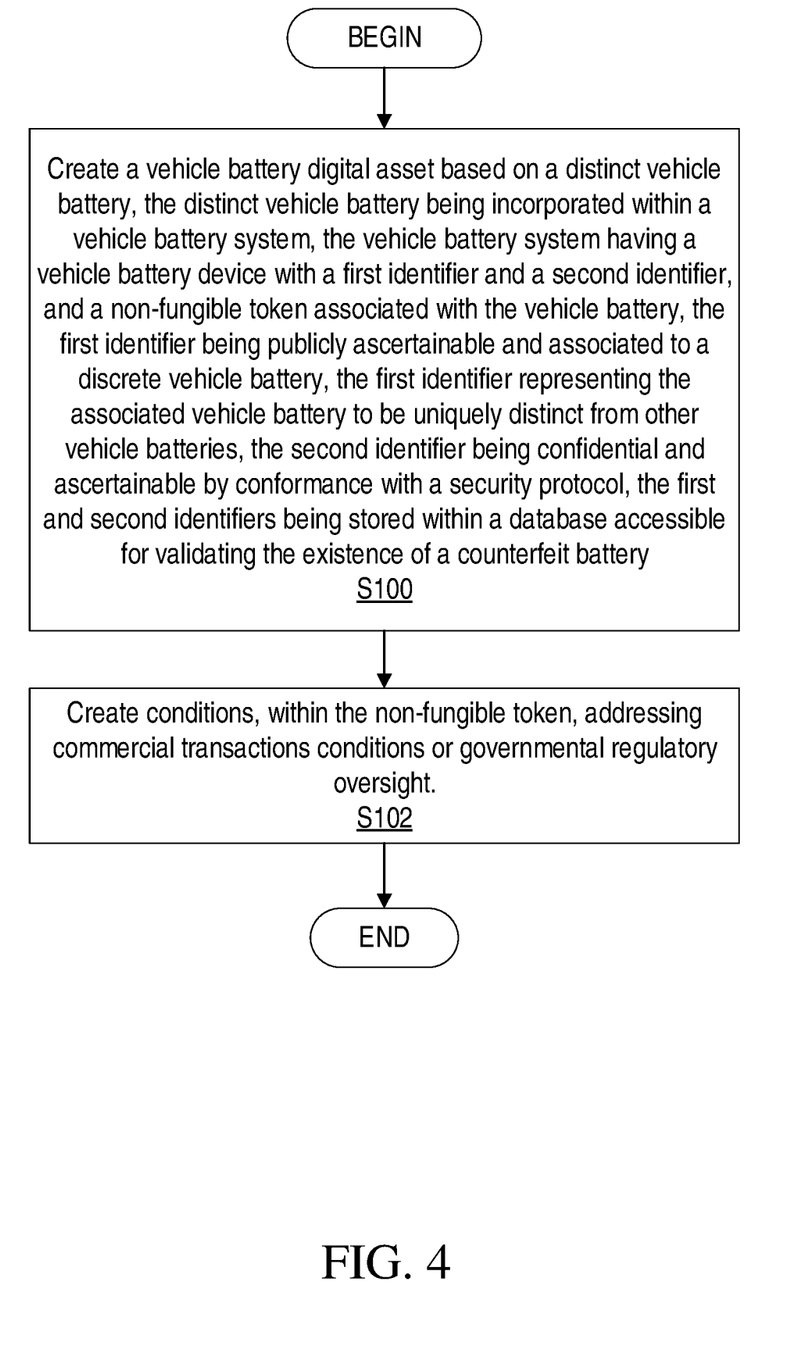
FIG. 4 shows a flowchart of an example process in accordance with the principles of present disclosure.

FIG. 4 shows an example process (e.g., implemented a MS 16 (and/or device 17 and/or any of its components), or any other component of system 30). The method includes creating (Block S100) a vehicle battery digital asset based on a distinct vehicle battery 10. The distinct vehicle battery 10 is incorporated within a vehicle battery system. The vehicle battery system has a vehicle battery device 17 with a first identifier and a second identifier, and a non-fungible token (NFT) associated with the vehicle battery 10. The first identifier is publicly ascertainable and associated to a discrete vehicle battery. The first identifier represents the associated vehicle battery 10 to be uniquely distinct from other vehicle batteries 10. The second identifier is confidential and ascertainable by conformance with a security protocol. The first and second identifiers are stored within a database (e.g., memory 48, 88, 128) accessible for validating the existence of a counterfeit battery. The method further includes creating (Block S102) conditions, within the non-fungible token, addressing commercial transactions conditions or governmental regulatory oversight.

In some embodiments, the NFT addresses commercial transaction conditions for vehicle battery leasing.

In some other embodiments, the NFT addresses commercial transaction conditions for vehicle battery servicing.

In some embodiments, the NFT addresses governmental regulatory oversight for vehicle battery importation.

In some other embodiments, the NFT addresses governmental regulatory oversight for vehicle battery exportation.

Having described the general process flow of arrangements of the disclosure and having provided examples of hardware and software arrangements for implementing the processes and functions of the disclosure, the sections below provide details and examples of arrangements for authenticating batteries (and/or their components).

Any of the steps described in the present disclosure may be performed by (and/or in conjunction with) any component of battery 10 of FIG. 1 and/or any component of system 30 of FIGS. 2 and 3 such as MS 16, device 17, server 34, and node 36.

The life cycle of a battery 10 may include one or more stages such as design, manufacturing, distribution (e.g., transport to sellers, lessors, service providers, export, import, etc.), use, end-of-life stage, recycling, extraction of recycled materials, transport to manufacturing facilities, etc. Each stage of the battery lifecycle may be associated with a life cycle attribute (LCA). For example, the design of a battery may provide specification information, market requirements, user and functional requirements, etc., which may become part of the battery LCA. The design may be followed by manufacturing which may include use of materials and/or components to produce the battery 10. During manufacturing, battery 10 (and/or its components) may be tested based on one or more requirements. The test results are recorded. Further, information about battery 10 and/or its components may be recorded and tracked (e.g., for traceability purposes, quality control, process improvement initiatives, etc.). For example, each component may have an identifier such as a serial number, product number, model, lot number, etc. Further, other identifiers associated with the distribution stage of the battery LCA may be used for tracking, such as location history, shipping parameters and/or conditions, export/import regulations, contractual obligations, etc.

In addition, LCAs associated with battery use may include battery use information, e.g., cracking information, load information, environmental parameters associated with use of the battery, etc., and LCA associated with end-of-use may include steps and process associated with the preparation of the battery 10 to terminate its use. Further, LCAs associated with recycling may include recycling information, e.g., recycling entity, recycling requirements, recycling processes, recycling parameters, etc. With respect to materials extracted from the recycled battery, LCAs may include information about materials extracted for use in other batteries, or to be disposed of. Information about the transportation of these materials may also be usable as LCA, e.g., percent of materials used in new batteries 10 which are derived from recycled materials. LCAs include calculable and physical attributes of the origins of battery to disposition of the battery, including starting materials, e.g., purity of lead or plastic, energy calculations of formation of these starting materials into battery components, sourcing certifications or representations of these starting material, e.g., free of child labor abuses or slavery, including the formation of the batteries using the battery starting materials, e.g., energy calculations or sourcing, the removal and/or replacement of the vehicle battery while in use, the disposition of the battery at the end of vehicle life cycle, the disposition of the remnants of the vehicle battery once disposed, and other such parameters of sourcing, use, repair and operational functionality of the vehicle battery 10, and the like.

Figure 5:
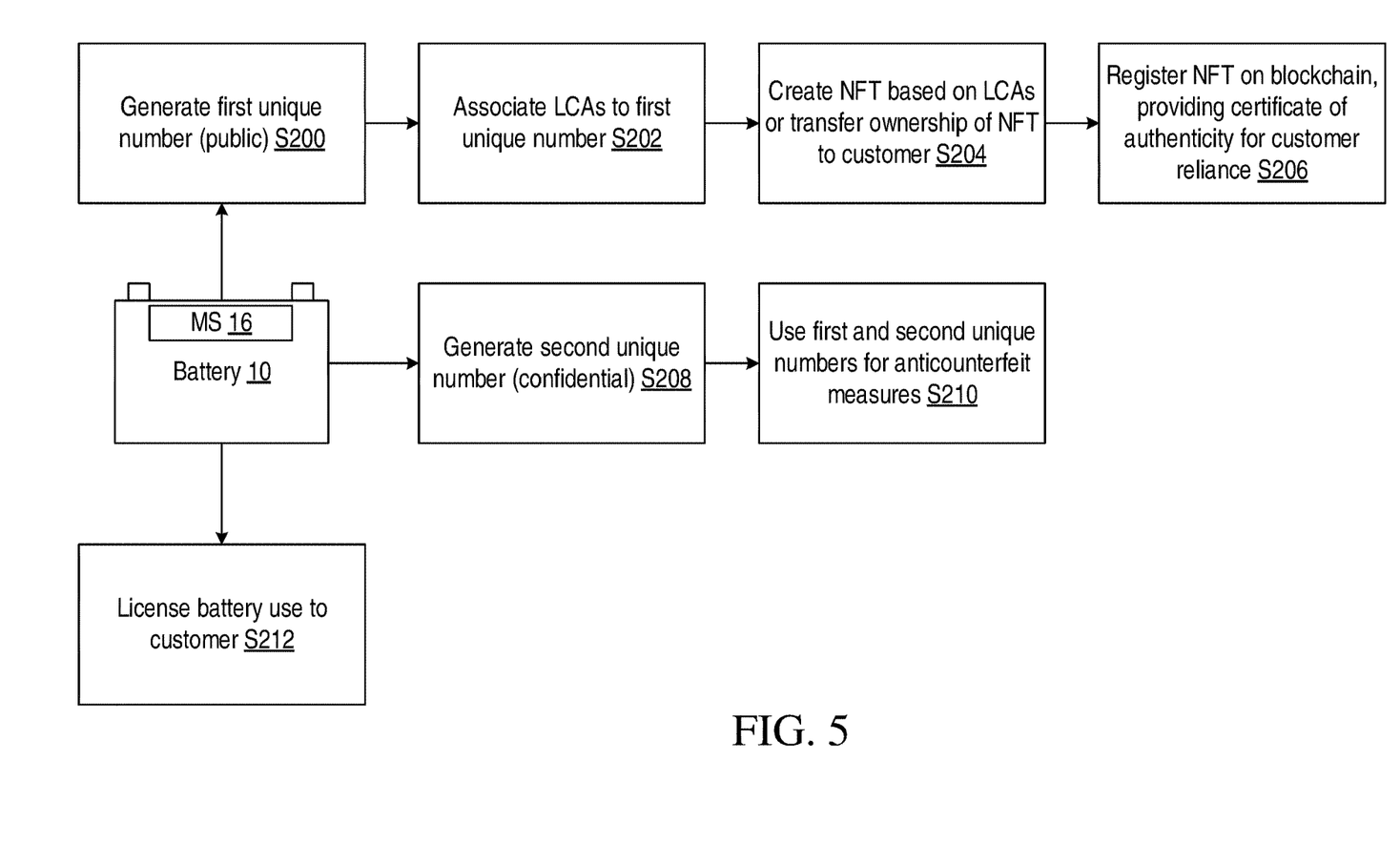
FIG. 5 shows another example process in accordance with the principles of present disclosure.

As shown in FIG. 5, and described in more detail below, the one or more embodiments describe a vehicle battery device 17 having a vehicle battery 10 with a first identifier being publicly ascertainable and associated to a discrete vehicle battery, and representing the associated vehicle battery 10 to be uniquely distinct from other vehicle batteries 10. A second identifier is confidential and ascertainable by conformance with security protocol. The security protocol may refer to one or more rules usable to determine the second identifier and may comprise an access control protocol cryptographic protocol, key management protocol, message integrity protocol, or any other protocol. Preferably, a digital asset is associated with the vehicle battery 10. The digital asset, preferably an NFT, defines life cycle attributes (LCAs) for commercial or governmental validation. Validation refers to the degree of fulfillment of the LCAs embodied in the NFT with the current state of the battery 10. As such, the validation may become self-evident and sufficient for objective evaluation of adhering to the commercial obligations or governmental requirement, e.g., showing whether conditions are met. In a preferred embodiment, the LCAs include commercial use applications of the vehicle battery, such as one or more of component sourcing of the vehicle battery 10, manufacturing of the vehicle battery 10, recycling of the vehicle battery 10, servicing of the vehicle battery 10, repair of the vehicle battery 10, replacement of the vehicle battery 10, conditions of use of the vehicle battery 10, reliability of the vehicle battery 10, functionality of the vehicle battery 10, operational performance of the vehicle battery 10, and programs and information relating to the vehicle battery 10. Additionally in another embodiment, the LCAs include governmental formalities of the vehicle battery 10, such as one or more of import validations of the vehicle battery 10, export validations of the vehicle battery 10, storage of the vehicle battery 10, component sourcing of the vehicle battery 10, manufacturing of the vehicle battery 10, recycling of the vehicle battery 10, servicing of the vehicle battery 10, repair of the vehicle battery 10, replacement of the vehicle battery 10, conditions of use of the vehicle battery 10, reliability of the vehicle battery 10, functionality of the vehicle battery 10, operational performance of the vehicle battery 10, and programs and information relating to the vehicle battery 10. The first identifier and second identifier can be sequenced to identify manufacturing origins of the vehicle battery 10, and in one preferred embodiment, the first identifier and second identifier are each sequenced to identify different manufacturing origins of the vehicle battery 10.

The vehicle battery system of the present disclosure includes a vehicle battery device 17 with a vehicle battery 10 with a first identifier that is publicly ascertainable and associated to a discrete vehicle battery, and representing the associated vehicle battery 10 to be uniquely distinct from other vehicle batteries, and a second identifier that is confidential and ascertainable by conformance with security protocol, together with a digital asset associated with the vehicle battery 10. Preferably, the first and second identifiers are stored within a database accessible for validating the existence of a counterfeit battery. The database of the vehicle battery system can be accessible by a governmental entity. In one embodiment, the digital assets represent LCAs for the commercial use of battery leasing or servicing. In another embodiment, the digital assets represent LCAs for governmental regulation of importation into or exportation out of a country.

In one embodiment, separate contractual obligations may be used to lease or license the product while ownership does not transfer. For example, in addition to the LCAs obligations, one entity retains ownership of the device, e.g., the battery 10, contractually leasing the battery 10 for use by the customer. In this situation, the LCAs embodied in the NFT are based on the contractual rights and obligations of the lessor and lessee of the battery 10.

The embodiments of the present disclosure provide for an anti-counterfeiting capability having a first device identifier that is publicly evident through physical inspection of the device 17 (and/or battery 10) and a second device identifier that is electronically confidential to the device 17 (and/or MS 16), the confidential identifier being ascertainable with proper conformance of electronic security protocols. The use of a confidential identifier, preferably electronic coding, together with a public identifier of the device 17 allows an initial accountability of the device 17 in commerce against anti-counterfeiting, first through the public identifier for ease of use within a large population of interested individuals or entities, including for example without limitation, wholesale or retail partner, government agents, original manufacturers, with second the more secure confirmation using the non-public, confidential, identifier for interrogation of suspect devices 17.

With the selective use of the confidential identifier, ease of commercial transit occurs using the physical public identifier, while the confidential identifier remains within a select group of users for use on suspect devices 17 or devices 17 that require a greater degree of confidence for validation of an original, non-counterfeited or un-adulterate, device, etc. With the confirmation of a device 17 relating both identifiers to each other, a greater degree of security is achieved. The public identifier, or indicator, may include numbers, alpha numeric codes, quick response (QR) codes, or other indicators that are physically placed onto the device 17 for identification through visual or tactile confirmation, and may include, without limitation, numbers, alpha numeric codes, and sequencing of identifiable patterns or symbology, including computer aided recognition. Confidential identifiers are secured sufficiently to interfere and/or prohibit the discovery of coding by unauthorized people or entities. The indicators, both public and private, are preferably stored within a database for interrogation and comparison with regard to a suspect device 17. As the suspect device 17 is initially identified through the public number, the confidential number is preferably used to validate the device 17 as being counterfeit or non-counterfeit. The confidential identifier of the device 17 is preferably stored within a processor (and/or memory) within the device 17 such as within memory and/or processor of MS 16.

In some embodiments, any of the components of device 17 (e.g., MS 16) and device 7 may be referred to as device 17. For example, device 17 may be arranged to receive a product such as within a space of device 17. The product in the space and device 17 may be referred to as device 17. In some embodiments, the product may be a product that has one or more characteristics that distinguish the product (e.g., an authentic product) from other products (e.g., which may be deemed counterfeit). In some embodiments the device 17 is a container that seals or encases the product in a manner that isolates the product from adulteration or counterfeit. Representative products may include, without limitation, validated goods having a need for continued authentication such as graded gems, sourcing of consumables, manuscripts, evaluated organs for transplant, and the like. In a nonlimiting example, the product is a battery 10 and/or MS 16 (e.g., a battery management system). However, device 17 (and/or the product) is not limited as such and can include any product. The device 17 is further detailed below in one or more of the most preferred embodiments of a vehicle battery 10.

In some embodiments, a vehicle battery device 17 comprises an accountability system for independently identifying a battery 10 within the life cycle of the battery 10 having a first unique identifier associated with the battery 10. The first unique identifier is physically located on the battery 10 and identifies the associated battery 10 to the exclusion of other vehicle batteries. The vehicle battery 10 is associated with a second unique identifier. The second unique identifier is associated with the battery 10 to the exclusion of other vehicle batteries and is accessible only through encoded interpretation.

In some other embodiments, a vehicle battery device 17 comprises an accountability system for independently identifying a battery 10 within the life cycle of the battery 10 having a first unique identifier associated with the battery 10. The first unique identifier is physically located on the battery 10 and identifies the associated battery 10 to the exclusion of other vehicle batteries. The vehicle battery 10 is associated with a second unique identifier. The second unique identifier is associated with the battery 10 to the exclusion of other vehicle batteries and is accessible only through encoded interpretation, where the first unique identifier is one or more of a physical engraving within the housing of the battery 10 and an electronic signal.

In some embodiments, a vehicle battery device 17 comprises an accountability system for independently identifying a battery 10 within the life cycle of the battery having a first unique identifier associated with the battery 10. The first unique identifier is physically located on the battery 10 and identifies the associated battery 10 to the exclusion of other vehicle batteries. The vehicle battery 10 is associated with a second unique identifier associated with the battery 10 to the exclusion of other vehicle batteries. The second unique identifier is accessible only through encoded interpretation, where the first unique identifier is one or more of a physical engraving within the housing of the battery 10 and an electronic signal. A digital asset is associated with the identification of the second unique identifier, where the digital asset represents one or more life cycle attributes.

In some other embodiments, a vehicle battery device 17 has an associated digital asset, where the digital asset represents specified life cycle attributes of the vehicle battery 10.

In some embodiments, a vehicle battery device 17 comprises an accountability system for independently identifying a battery 10 within the life cycle of the battery having a first unique identifier associated with the battery 10. The first unique identifier is physically located on the battery 10 and identifies the associated battery 10 to the exclusion of other vehicle batteries. The vehicle battery 10 is associated with a second unique identifier associated with the battery 10 to the exclusion of other vehicle batteries. The second unique identifier is accessible only through encoded interpretation, where the first unique identifier is one or more of a physical engraving within the housing of the battery 10 and an electronic signal. The vehicle device may further have a digital asset associated with the identification of the second unique identifier, where the digital asset represents one or more life cycle attributes and comprises a non-fungible token.

In some embodiments, a lead acid vehicle battery device 17 comprises an accountability system for independently identifying a battery 10 within the life cycle of the battery 10 having a first unique identifier associated with the battery 10. The first unique identifier is physically located on the battery 10 and identifies the associated battery 10 to the exclusion of other vehicle batteries. The vehicle battery 10 is associated with a second unique identifier. The second unique identifier is associated with the battery 10 to the exclusion of other vehicle batteries and is accessible only through encoded interpretation.

In some other embodiments, a vehicle battery device 17 comprises an accountability system for independently identifying a battery 10 within the life cycle of the battery 10 having a first unique identifier associated with the battery 10. The first unique identifier is physically located on the battery 10 and identifies the associated battery 10 to the exclusion of other vehicle batteries. The vehicle battery 10 is associated with a second unique identifier. The second unique identifier is associated with the battery 10 to the exclusion of other vehicle batteries and is accessible only through encoded interpretation, and a locator (e.g., locator identifier (ID), locator device, locator record, etc.).

In some embodiments, a vehicle battery device 17 comprises an accountability system for independently identifying a battery 10 within the life cycle of the battery 10 having a first unique identifier associated with the battery 10. The first unique identifier is physically located on the battery 10 and identifies the associated battery 10 to the exclusion of other vehicle batteries. The vehicle battery 10 is associated with a second unique identifier associated with the battery 10 to the exclusion of other vehicle batteries. The second unique identifier is accessible only through encoded interpretation, with the vehicle battery 10 further comprising battery diagnostics.

According to one aspect, a method (e.g., implemented by MS 16 and/or device 17) is described. The method includes creating a digital asset based on a distinct product, where the distinct product is incorporated within device 17, and creating conditions, within a non-fungible token, addressing commercial transactions conditions or governmental regulatory oversight.

In some embodiments, device 17 has a first identifier and a second identifier, and the non-fungible token. The first identifier is publicly ascertainable and associated to a discrete product. The first identifier represents the associated product to be uniquely distinct from other products. The second identifier is confidential and ascertainable by conformance with a security protocol.

In some other embodiments, the first and second identifiers are usable for validating the existence of a counterfeit product.

According to another aspect, a method is described. The method includes creating a vehicle battery digital asset based on a distinct vehicle battery 10, where the distinct vehicle battery 10 is incorporated within a vehicle battery system, and creating conditions, within the non-fungible token, addressing commercial transactions conditions or governmental regulatory oversight. The vehicle battery system has a vehicle battery device 17 with a first identifier and a second identifier and a non-fungible token associated with the vehicle battery 10, the first identifier being publicly ascertainable and associated to a discrete vehicle battery 10, the first identifier representing the associated vehicle battery 10 to be uniquely distinct from other vehicle batteries, the second identifier being confidential and ascertainable by conformance with a security protocol, the first and second identifiers being stored within a database accessible for validating the existence of a counterfeit battery.

According to one aspect, a method (e.g., implemented by MS 16 and/or device 17) is described. The method ascertains vehicle battery parameters by creating a vehicle battery digital asset based on a distinct vehicle battery 10, with the distinct vehicle battery 10 incorporated within a vehicle battery system. The vehicle battery system has a vehicle battery device 17 with a first and a second identifier, and a non-fungible token associated with the vehicle battery 10. The first identifier is publicly ascertainable and associated to a discrete vehicle battery 10. The first identifier further represents the associated vehicle battery 10 to be uniquely distinct from other vehicle batteries. The second identifier is confidential and ascertainable by conformance with security protocol. The first and second identifiers are stored within a database accessible for validating the existence of a counterfeit battery. With this created digital asset conditions are created within the non-fungible token addressing commercial transactions conditions or governmental regulatory oversight. In the case of the non-fungible token addresses commercial transaction conditions for vehicle battery leasing, a separate license may be executed in addition to the NFT, licensing the battery 10 owned by the manufacturer, as evidenced by the NFT, to the customer. Likewise the NFT can address commercial transaction conditions for vehicle battery servicing, or governmental regulatory oversight for vehicle battery importation or exportation. A recycled battery product results from the total expanse of this method over the life of the vehicle battery 10.

Information about battery 10 (including identifiers), LCAs, and NFTs may be used to authenticate the battery 10. That is, a battery 10 may be determined to be authenticated if at least a subset of information of a set of information corresponds to (e.g., matches, is similar to, etc.) information previously known by an entity (e.g., by the battery owner, user, manufacturer, etc.).

FIG. 5 shows an example battery management process (i.e., method) in accordance with the principles of the present disclosure. Any of the steps of the battery management process may be performed by any component of system 30 (e.g., MS 16, device 17, server 34, node 36, etc.) and may include authenticating battery 10 and/or its components. More specifically, the method may include generating (i.e., determining)(Block S200) a first unique number (i.e., first identifier such as a unique identifier, unique code), which may be public, associating (Block S202) one or more attributes such as LCAs (e.g., date of manufacturing of battery 10, recycling information, state of health (SOH), serial number of battery 10, lot number of battery 10, etc.) to a unique number such as the first unique number, and creating (i.e., determining, obtaining) (Block S204) an NFT, which may be based on the one or more attributes or determining an ownership and/or establish/terminate/transfer ownership of the NFT, e.g., transfer NFT ownership to the customer. The method may also include registering (Block S206) NFT on a blockchain, and/or providing a certificate of authenticity, e.g., using the NFT for customer reliance. In some embodiments, the method may further include generating (Block S208) a second identifier (e.g., unique number), which may be confidential/private, using (Block S210) the first and/or second identifiers for anti-counterfeit measures and/or determine and/or execute one or more anti-counterfeit measures such as disabling/enabling battery 10 (and/or use of battery 10), associate battery 10 with a counterfeit action, revoke a license, etc. In addition, the method may include granting battery use to a customer, e.g., when the certificate of authenticity is established and/or determined. In some embodiments, generating and/or determining the first identifier may include determining a random number, a number based on a vehicle identification number (VIN), any other number, etc. Generating and/or determining the second unique number may include determining a number that is unique and only known by one or more persons.

With respect to step S200, determining the first identifier may include MS 16 being preconfigured with an identifier (e.g., unique serial number) of the MS 16 and/or battery 10 (or any of its components). Server 34 and/or node 36 may be configured to communicate with MS 16 to extract the identifier (and/or provide the identifier to the MS 16). The first identifier may be modified by adding a prefix, suffix, by inserting a number, etc. With respect to step S202, the first identifier may be associated with LCAs. For example, the first identifier may be a unique number that maps to a multitude of LCAs of the battery. With respect to step S204, an NFT may be created with or without additional information. For example, an NFT may be created based on LCAs and/or the first identifier. In some embodiments, the NFT is created if there is no other existing NFT that corresponds to the first identifier and/or LCAs. If there is an existing NFT associated with the first identifier and/or LCAs, the NFT may be used for transferring ownership (of the performance of the battery 10) to the user or customer of the battery 10. The ownership of the battery may be left with the manufacturer such as in the case of a battery 10 provided as part of a battery as a service (BAAS) program. In some other embodiments, the first identifier and LCAs may be stored in a component of system 30 such as MS 16, server 34, and/or node 36. The first identifier and/or at least a portion of the LCAs may be encrypted for security. The NFT may comprise a unique identifier (i.e., token identifier (ID)) and metadata. The metadata may include information about the asset to which the NFT is tied to. In some embodiments, the NFT is amended to include the first identifier (e.g., encrypted) and/or at least a portion of the LCAs or other information usable by any of the components of system 30 to extract the first identifier and/or the other portion of the LCA. In some other embodiments, the NFT may include information associated with the battery 10 such as contractual obligations associated with a battery service, where the contractual obligations may include performance metrics of the battery which are expected as part of the battery service. In some embodiments, the NFT represents LCAs for the commercial use of battery leasing or servicing, for governmental regulation of importation and exportation.

With respect to step S206, the NFT may be registered (e.g., minted) on blockchain. The registered NFT may be used to provide a certificate of authenticity of battery 10 (i.e., meeting one or more requirements, conditions, etc.). For example, the NFT may be used to confirm that battery 10 was manufactured following predetermined manufacturing standards, using materials that are safe to the environment, using (or exceeding) a predetermined percentage of recycled materials, meeting predetermined labor conditions, meeting contractual obligations and/or export/import regulations, etc. With respect to step S208, a second identifier may be generated based on the first identifier, the LCAs, NFT, other battery information, customer information, etc., and used (along with the first identifier) for anti-counterfeit measures.

In a nonlimiting example, a serial number AB1000DC of battery 10 may be preconfigured in the MS 16. Node 36 may be configured to communicate with MS 16 and obtain the serial number AB1000DC. The serial number may be appended with a randomized value, i.e., 999Z such that the first identifier is AB1000DC999Z. At least a portion of the first identifier may be public, i.e., the serial number. Node 36 (and/or MS 16 and/or server 34) may associate the first identifier with a subset of LCAs such as the percentage of recycled materials (i.e., percent of recycled lead), historical values of cell voltage (e.g., 12.5V average in six months), and manufacturing location with the first identifier, which can be used to create and mint an NFT. In addition, a second identifier that is kept secret (i.e., private, confidential) is generated, e.g., by node 36 (and/or MS 16 and/or server 34).

A customer subscribed to a BAAS program may want to replace battery 10. The customer may provide information in order to authenticate battery 10 before being replaced. For example, the customer may enter the second identifier on node 36 (and/or the first identifier) which are compared to the first identifier of step S200 and the second identifier of step S208. If the comparison results in a match, the battery is authenticated and replaced. If the comparison does not result in a match (e.g., customer forgot the second identifier), the customer may provide the NFT (and/or its information) as a certificate of reliance showing a unique token ID that corresponds to the battery 10 (and/or serial number AB1000DC). If the comparison does not result in a match and/or the customer is unable to provide the NFT, the battery is not replaced (and/or a message alerting that the battery was not authenticated may be transmitted to server 34, node 36). In addition, an indication that the license to use the battery as part of the BAAS has been revoked (e.g., after a predetermined number of attempts) may be provided.

In another nonlimiting example, an operator of a vehicle having a battery may want to engage in a battery replacement program (e.g., BAAS). Rather than owning a battery 10, the operator licenses the use of one or more batteries 10 from the manufacturer. This license may be obtained when the battery is purchased or included as part of a new vehicle sale where the vehicle manufacturer has obtained the license. The operator may want to replace a battery associated with and/or owned by a battery manufacturer with another battery associated with and/or owned by the battery manufacturer. The operator may, e.g., via MS 16 and/or server 34 and/or node 36, register an NFT on blockchain, which may provide a certificate of authenticity (of the battery). To replace the first battery with a second battery, the operator obtains a new NFT for the second battery that provides a certificate of authenticity of the second battery, e.g., ensuring that the second battery meets the requirements of the vehicle, user requirements, manufacturer requirements/specifications, etc. Accordingly, the operator of the vehicle can engage in battery replacement while still ensuring authenticity of battery 10.

In one nonlimiting example, each battery 10 generates a hidden random number (e.g., alpha-numeric 10 digits). The hidden random number may be the second identifier (and/or first identifier), which may be repeatedly discovered by the manufacturer of battery 10, e.g., by Clarios, using a secure means, e.g., components of battery 10 and/or system 30. The hidden random number may represent an individual battery and may be associated virtually to create an NFT capturing one or more selected attributes of that individual battery 10, e.g., with the NFT recorded on blockchain. The selected attribute/property may include reliability (warranty), life cycle management (lead recycling), or other determined attributes. The NFT may provide a certificate of authenticity, and/or blockchain may provide a digital ledger. As the NFT may embody ownership of the performance of the battery (e.g., not ownership of the battery itself), ownership may be retained by the battery manufacturer, e.g., Clarios. Put simply, the methods, apparatuses, and systems described herein are useful in validating each individual battery at least for (1) controlling fraud in warranty claims; (2) accounting lead recycling; and (3) providing the battery manufacturer, e.g., Clarios, with a reliable BAAS business model.

In some embodiments, NFTs may be used to associate battery 10 (and/or MS 16) with a vehicle (and/or vehicle information) and/or person (and/or information about the person). In one nonlimiting example, a battery 10 associated with a vehicle may be enabled/disabled based at least in part on information associated with the vehicle and/or an NFT. During manufacturing/sale of the vehicle, the association of the vehicle with the battery 10 may be completed and information corresponding to this association may be stored on the blockchain via an NFT. The battery-vehicle association may be determined at least in part by MS 16 reading a VIN associated with the vehicle. While the battery-vehicle association is maintained the battery may be enabled, e.g., providing power. If the battery 10 is removed from the vehicle (e.g., stolen and/or removed without authorization from the owner and/or the MS 16 is unable to read the VIN (or other vehicle identifying indicia) associated with the vehicle), the MS 16 may disable the battery 10 and/or alert server 34 that the battery 10 has been removed from the vehicle associated with the battery 10.

In some other embodiments, a battery 10 associated with a person may be enabled/disabled based at least in part on information associated with the person and/or an NFT. During the sale of a vehicle to a person/vehicle owner, the association of the person with the battery 10 may be completed. The battery-person association may be determined at least in part by MS 16 reading a unique identifier associated with the person, e.g., a smartphone. While the battery-person association is maintained the battery 10 may be enabled, e.g., providing power. For example, MS 16 may use an NFT and/or personal information to authenticate that a person is the registered owner of the battery 10 and grant a warranty service that is available to the registered owner. However, if the person is determined to not be the registered owner, the MS 16 may disable the battery 10 by disabling power and/or decline the warranty service that is available to the registered owner.

In some embodiments, battery 10 may be audited (e.g., by MS 16, server 34, node 36) to ensure that current parameters meet predetermined requirements and/or ensure that licensing terms are not breached. The audit may include reporting of the battery parameters, specifications, events, etc., throughout the lifecycle of battery 10. Audits and reports may be associated with governmental entities such as environmental regulators, import/export agencies, etc.

In some other embodiments, a test may be performed on battery 10, which can include testing actual battery components and comparing the test results to historical and/or expected performance corresponding to the NFT such as to ensure a battery is not counterfeit. For example, an NFT may correspond to a battery 10 that is associated with LCAs and battery parameters indicating a predetermined performance level. A battery that is counterfeit may not be able to pass a performance test based on the LCAs and battery parameters associated with the NFT. The test may also be used to predict battery failure. In one or more embodiments, testing may yield test results that indicate pass or fail. In one embodiment, the test results may indicate an indication that a parameter is likely to pass or fail. In another embodiment, the test results may indicate whether one or more parameters are within a predetermined range and the likelihood that the parameter may or may not be within the predetermined range.

In some embodiments, the battery 10 can be monitored by MS 16, server 34 and/or node 36, where the monitoring may be ongoing. The monitoring may be performed to track the progress of the battery 10 such as with respect to its lifecycle.

The apparatuses, systems, and methods described herein are beneficial at least because: battery ownership may remain with the battery owner, e.g., CLARIOS; a customer of the battery owner, e.g., licensee, is allowed to own the NFT; license of battery use may be provided to a customer via the NFT; and/or each battery 10 may be distinguished from other batteries.

In some embodiments, the battery 10 is associated with the first identifier, the second identifier, and the NFT may be one of a lithium-ion battery and a lead-acid battery. In some other embodiments, the first identifier, the second identifier, and the NFT may be associated with the battery 10 arranged for one or more of a low-voltage system (e.g., configured to operate at or under 60 V), a high voltage system, etc. In some embodiments, the first identifier, the second identifier, and the NFT may be associated with a predetermined battery chemistry. In some other embodiments, the first identifier, the second identifier, and the NFT may be associated with a low-voltage lead acid battery.

In one or more embodiments, MS 16 (and/or device 17) may be configured to provide location information associated with MS 16 (and/or device 17) and/or battery 10. In some embodiments, the location information may be used to perform one or more functions of the present disclosure such as to authenticate battery 10, validate battery 10, test battery 10, perform anti-counterfeiting measures, etc. In some embodiments, MS 16 (and/or device 17) may include a global positioning system (GPS) configured to provide the location information.

It is understood that all specification values shown and described herein are non-limiting examples for implementations of batteries 10, cells 14, MS 16, and/or system 10 constructed in accordance with the principles of the disclosure provided herein. It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings and without departing from the scope of the following claims.

What is claimed is:

1. A vehicle battery device comprising:
a vehicle battery having a first battery terminal, a second battery terminal, a management system (MS) and a circuit element in communication with the MS, the circuit element being electrically coupled to the first battery terminal and the second battery terminal, the MS comprising processing circuitry configured to:
determine a first identifier, the first identifier being publicly ascertainable and associated to a discrete vehicle battery, the first identifier representing the associated vehicle battery to be uniquely distinct from other vehicle batteries;
determine a second identifier, the second identifier being:
different from the first identifier;
an electronically retrievable identifier;
confidential; and
ascertainable by conformance with a security protocol; and
determine a digital asset associated with the vehicle battery based on at least one of the first identifier and the second identifier, the digital asset defining life cycle attributes (LCAs) for commercial validation or governmental validation, the LCAs addressing commercial use of the vehicle battery or governmental formalities of the vehicle battery, the LCAs that address the commercial use being selected from a first group comprising at least recycling of the vehicle battery, replacement of the vehicle battery, and operational performance of the vehicle battery, the recycling of the vehicle battery being associated with recycling information including a recycling entity, the LCAs including one or more sourcing certifications of one or more materials used to manufacture the vehicle battery, the one or more sourcing certifications certifying that the one or more materials are free of labor abuse; and
trigger the circuit element to enable or disable the vehicle battery based on the first identifier, the second identifier, and the digital asset, the LCAs including the one or more sourcing certifications, and the LCAs that address the commercial use selected from the first group comprising at least recycling of the vehicle battery, replacement of the vehicle battery, and operational performance of the vehicle battery, wherein enabling the vehicle battery includes causing the vehicle battery to provide power via the first battery terminal and second battery terminal, and disabling the vehicle battery includes preventing the vehicle battery from providing power via the first battery terminal and second battery terminal.

2. The vehicle battery device of claim 1, wherein the digital asset is a non-fungible token.

3. The vehicle battery device of claim 1, wherein the LCAs that address commercial use of the vehicle battery are further selected from a second group consisting of component sourcing of the vehicle battery, manufacturing of the vehicle battery, servicing of the vehicle battery, repair of the vehicle battery, conditions of use of the vehicle battery, reliability of the vehicle battery, functionality of the vehicle battery, programs and information relating to the vehicle battery, and combinations thereof.

4. The vehicle battery device of claim 1, wherein the LCAs that address governmental formalities of the vehicle battery are selected from a third group consisting of import validations of the vehicle battery, export validations of the vehicle battery, storage of the vehicle battery, component sourcing of the vehicle battery, manufacturing of the vehicle battery, recycling of the vehicle battery, servicing of the vehicle battery, repair of the vehicle battery, replacement of the vehicle battery, conditions of use of the vehicle battery, reliability of the vehicle battery, functionality of the vehicle battery, operational performance of the vehicle battery, programs and information relating to the vehicle battery, and combinations thereof.

5. The vehicle battery device of claim 1, wherein the first identifier and the second identifier are sequenced to identify manufacturing origins of the vehicle battery.

6. The vehicle battery device of claim 5, wherein the first identifier and the second identifier are each sequenced to identify different manufacturing origins of the vehicle battery.

7. A vehicle battery system comprising a vehicle battery device having:
a vehicle battery having a first battery terminal, a second battery terminal, a management system (MS) and a circuit element in communication with the MS, the circuit element being electrically coupled to the first battery terminal and the second battery terminal, the MS comprising processing circuitry configured to:
determine a first identifier, the first identifier being publicly ascertainable and associated to a discrete vehicle battery, the first identifier representing the associated vehicle battery to be uniquely distinct from other vehicle batteries;
determine a second identifier, the second identifier being:
different from the first identifier;
an electronically retrievable identifier;
confidential; and
ascertainable by conformance with a security protocol; and
determine a digital asset associated with the vehicle battery based on at least one of the first identifier and the second identifier, the digital asset defining life cycle attributes (LCAs) for commercial validation or governmental validation, the LCAs addressing commercial use of the vehicle battery or governmental formalities of the vehicle battery, the LCAs that address the commercial use being selected from a first group comprising at least recycling of the vehicle battery, replacement of the vehicle battery, and operational performance of the vehicle battery, the recycling of the vehicle battery being associated with recycling information including a recycling entity, the LCAs including one or more sourcing certifications of one or more materials used to manufacture the vehicle battery, the one or more sourcing certifications certifying that the one or more materials are free of labor abuse; and
trigger the circuit element to enable or disable the vehicle battery based on the first identifier, the second identifier, and the digital asset, the LCAs including the one or more sourcing certifications, and the LCAs that address the commercial use selected from the first group comprising at least recycling of the vehicle battery, replacement of the vehicle battery, and operational performance of the vehicle battery, wherein enabling the vehicle battery includes causing the vehicle battery to provide power via the first battery terminal and second battery terminal, and disabling the vehicle battery includes preventing the vehicle battery from providing power via the first battery terminal and second battery terminal.

8. The vehicle battery system of claim 7, wherein the database is accessible by a governmental entity.

9. The vehicle battery system of claim 7, wherein the digital asset represents the LCAs that address commercial use of battery leasing.

10. The vehicle battery system of claim 7, wherein the digital asset represents the LCAs that address commercial use of battery servicing.

11. The vehicle battery system of claim 7, wherein the digital asset represents the LCAs that address governmental regulation of importation into a country.

12. The vehicle battery system of claim 7, wherein the digital asset represents the LCAs that address governmental regulation of exportation from a country.

13. A method for ascertaining vehicle battery parameters, the method being implemented by a management system (MS) of a distinct vehicle battery, the distinct vehicle battery being incorporated within a vehicle battery system, the distinct vehicle battery having a first battery terminal, a second battery terminal, and a circuit element in communication with the MS, the circuit element being electrically coupled to the first battery terminal and the second battery terminal, the MS comprising processing circuitry, the method comprising the steps of:
creating, by the processing circuitry of the MS, a digital asset based on the distinct vehicle battery, a first identifier, and a second identifier, the digital asset defining life cycle attributes (LCAs) for commercial validation or governmental validation, the LCAs addressing commercial use of the distinct vehicle battery or governmental formalities of the distinct vehicle battery, the LCAs that address the commercial use being selected from a first group comprising at least recycling of the vehicle battery, replacement of the vehicle battery, and operational performance of the vehicle battery, the recycling of the vehicle battery being associated with recycling information including a recycling entity, the LCAs including one or more sourcing certifications of one or more materials used to manufacture the vehicle battery, the one or more sourcing certifications certifying that the one or more materials are free of labor abuse, the first identifier being publicly ascertainable and associated to a discrete vehicle battery, the first identifier representing the associated vehicle battery to be uniquely distinct from other vehicle batteries, the second identifier being confidential and ascertainable by conformance with a security protocol, the first and second identifiers being stored within a database accessible for validating an existence of a counterfeit battery;

creating, by the processing circuitry of the MS, conditions within the digital asset, the conditions addressing commercial transactions conditions associated with the commercial use of the distinct vehicle battery or governmental regulatory oversight associated with the governmental validation of the distinct vehicle battery; and triggering, by the processing circuitry of the MS, the circuit element to enable or disable the distinct vehicle battery based on the first identifier, the second identifier, and the digital asset, the LCAs including the one or more sourcing certifications, and the LCAs that address the commercial use selected from the first group comprising at least recycling of the vehicle battery, replacement of the vehicle battery, and operational performance of the vehicle battery, wherein enabling the distinct vehicle battery includes causing the distinct vehicle battery to provide power via the first battery terminal and second battery terminal, and disabling the distinct vehicle battery includes preventing the distinct vehicle battery from providing power via the first battery terminal and second battery terminal.

14. The method of claim 13, wherein the digital asset addresses commercial transaction conditions for vehicle battery leasing.

15. The method of claim 13, wherein the digital asset addresses commercial transaction conditions for vehicle battery servicing.

16. The method of claim 13, wherein the digital asset addresses governmental regulatory oversight for vehicle battery importation.

17. The method of claim 13, wherein the digital asset addresses governmental regulatory oversight for vehicle battery exportation.

18. A recycled battery product resulting from a method for ascertaining vehicle battery parameters, the method being implemented by a management system (MS) of the recycled battery product, the recycled battery product being incorporated within a vehicle battery system, the recycled battery product having a first battery terminal, a second battery terminal, and a circuit element in communication with the MS, the circuit element being electrically coupled to the first battery terminal and the second battery terminal, the MS comprising processing circuitry, the method comprising the steps of:

creating, by the processing circuitry of the MS, a digital asset based on the recycled battery product, a first identifier, and a second identifier, the digital asset defining life cycle attributes (LCAs) for commercial validation or governmental validation, the LCAs addressing commercial use of the recycled battery product or governmental formalities of the recycled battery product, the LCAs that address the commercial use being selected from a first group comprising at least recycling of the recycled battery product, replacement of the recycled battery product, and operational performance of the recycled battery product, the recycling of the recycled battery product being associated with recycling information including a recycling entity, the LCAs including one or more sourcing certifications of one or more materials used to manufacture the recycled battery product, the one or more sourcing certifications certifying that the one or more materials are free of labor abuse, the first identifier being publicly ascertainable and associated to a discrete recycled battery product, the first identifier representing the associated recycled battery product to be uniquely distinct from other recycled battery products, the second identifier being confidential and ascertainable by conformance with a security protocol, the first and second identifiers being stored within a database accessible for validating an existence of a counterfeit recycled battery product;

creating, by the processing circuitry of the MS, conditions within the digital asset, the conditions addressing commercial transactions conditions associated with the commercial use of the recycled battery product or governmental regulatory oversight associated with the governmental validation of the recycled battery product; and triggering, by the processing circuitry of the MS, the circuit element to enable or disable the recycled battery product based on the first identifier, the second identifier, and the digital asset, the LCAs including the one or more sourcing certifications, and the LCAs that address the commercial use selected from the first group comprising at least recycling of the recycled battery product, replacement of the recycled battery product, and operational performance of the recycled battery product, wherein enabling the recycled battery product includes causing the recycled battery product to provide power via the first battery terminal and second battery terminal, and disabling the recycled battery product includes preventing the recycled battery product from providing power via the first battery terminal and second battery terminal.

* * * * *